Patented May 30, 1950

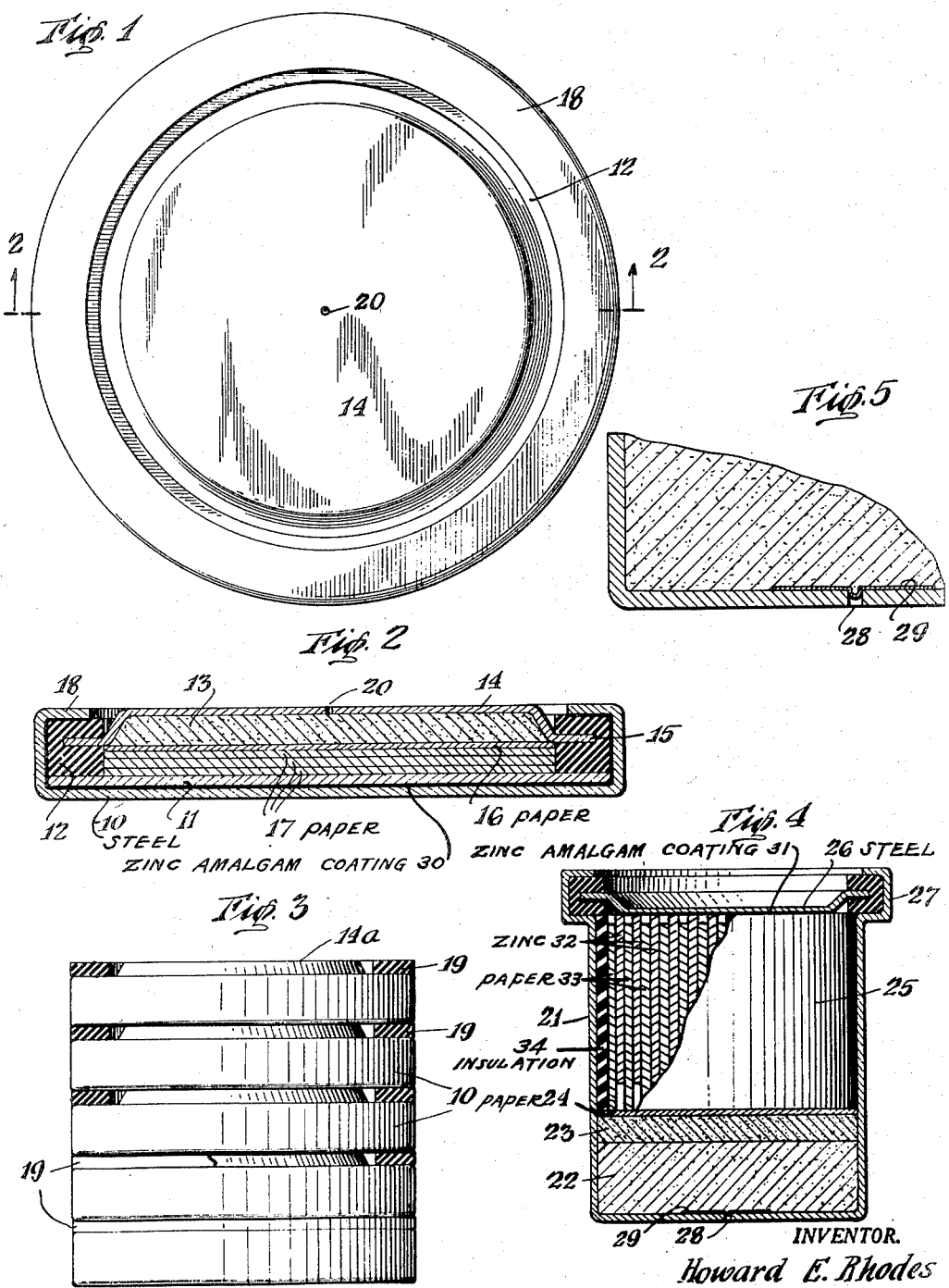

2,509,249

UNITED STATES PATENT OFFICE 2,509,249

ALKALINE PRIMARY CELL

Howard E. Rhodes, Indianapolis, Ind., assignor to P. R. Mallory & Co., Inc., Indianapolis, Ind., a corporation of Delaware Application November 7, 1944, Serial No. 562,338

12 Claims. (Cl. 136—111)

This invention relates to primary cells.

An object of the invention is to improve the construction and composition of primary cells.

Other objects of the invention will be apparent from the description and claims.

In the drawings:

Figure 1 is a top view of a primary cell embodying features of the present invention;

Figure 2 is a cross section thereof;

Figure 3 illustrates a battery of cells;

Figure 4 is a section of a cell of different construction; and

Figure 5 is a detail of the vent construction of the cell of Figure 4.

A feature of the present invention resides in the use of an amalgamated ferrous metal terminal for the zinc electrode of the cell. The invention also contemplates an improved cell construction, and an improved vent construction.

In primary cells of the zinc-alkali-oxide type one electrode is of zinc, the other electrode of a depolarizer oxide composition such as mercuric oxide or cupric oxide mixed with graphite, and the electrolyte an aqueous solution of an alkali such as potassium hydroxide and may also contain the alkali zincate. In one construction of such cells the depolarizer is pressed into the bottom of a steel container and a zinc top disc terminal is sealed in the top of the container with a neoprene or rubber sealing grommet, the top being in contact with the zinc electrode inside the cell.

It has been noted that unless an extremely high pressure seal is maintained between the grommet and the zinc top there is a tendency for the alkaline electrolyte to creep along the zinc surface under the grommet to the outside of the cell where the combined effects of the alkali, air, moisture and $CO_2$ produces corrosion of the zinc. This creepage tendency appears to be specific to zinc, as no such tendency has been noted between the surface of the steel and the grommet member. If a strip of zinc is partially immersed in an alkali electrolyte the creepage of electrolyte above the surface occurs rapidly. On the other hand if a strip of steel is partially immersed in electrolyte this creepage does not occur.

Heretofore it has been considered necessary to make the top or terminal member which is in contact with the zinc anode of the cell out of zinc or a metal having substantially no potential difference with zinc when immersed in the cell electrolyte. For example, it has been considered impossible to use iron or steel in contact with the zinc because of the potential difference of .5 to .6 volt between plain steel and an amalgamated or unamalgamated zinc electrode. The potential difference between plain steel and amalgamated or unamalgamated zinc generates a current between these two metals and the zinc is gradually corroded while at the steel electrode hydrogen gas is generated. The corrosion of the zinc would normally not permit the use of a steel electrode in contact with the zinc but when an attempt is made to hermetically seal the cell then further difficulty is encountered because of the internal gas pressure developed by the release of the hydrogen at the steel electrode.

I have made some experiments in which I have found that by treatment of the steel the above effects can be eliminated. By treatment of the steel for a period of about 30 seconds at 60° C. in an aqueous solution containing 5% of mercuric nitrate acidified with about 1% of nitric acid I found no reduction in the open circuit potential difference between the two metals but I did find a marked reduction in the generation of gas. If a piece of plain steel and a piece of zinc are connected together and immersed in an alkali electrolyte a rapid evolution of gas at the steel electrode is immediately evident; if the steel is pretreated in the mercuric nitrate-nitric acid solution then there is no visible generation of gas and only very small amounts of the gas can be detected ever relatively long periods of time.

I have now found that if the steel electrode is provided with a thin surface layer of amalgamated zinc no gas is generated when the treated steel is placed in contact with the zinc electrode in the cell electrolyte. This makes possible a primary cell construction having a treated steel terminal in contact with the zinc electrode and if desired another steel terminal in contact with the depolarizing electrode. The amalgam coated steel terminal does not exhibit the electrolyte creepage and corrosion tendency of a zinc terminal.

Referring to the drawings, Figures 1 and 2 illustrate a flat cell construction I have devised which embodies such a terminal as well as other novel features. The cell comprises a circular flat metal cup 10 formed of cold rolled steel which has been amalgam coated as described above. The inside surface of this cup is provided with the zinc amalgam coating 30 which may be applied by rubbing it with amalgamated zinc, tumbling it with amalgamated zinc powder, or by other methods. The zinc electrode 11 of the cell comprises an amalgamated zinc disc which fits snugly into the bottom of the cup 10.

The preferred method of producing the amalgamated coating on the steel is to first treat the steel electrode in a plating solution to produce a zinc coating of from .0001 to about .0005 inch thick although heavy coatings can be used satisfactorily. The pre-plated steel is then placed in a solution containing a mercury compound. One example of such a solution is the mercuric nitrate-nitric acid solution previously referred to. Satisfactory amalgamation is also obtained in an aqueous solution consisting of 100 cc. of water, 50 to 75 grams of potassium hydroxide and 3 grams of mercuric cyanide. The amalgamation procedure may be done at room temperature for a period of approximately 1½ minutes or it may be done at elevated temperature at say 60° C. in approximately 30 seconds. After amalgamation it is desirable that the parts be washed in a solution consisting of 100 cc. of water and 50 to 75 grams of potassium hydroxide. The washing may be done at room temperature and should be followed by a wash in pure water to remove all traces of alkali. The above amalgamating procedure will produce a zinc amalgamed coating containing between approximately 3 and 10% of mercury.

A circular neoprene or rubber sealing member 12 rests on top of the zinc electrode and against the vertical peripheral wall of the cup 10 and carries within its central aperture an electrode and spacer assembly comprising depolarizing electrode 13 formed of a mixture of mercuric oxide or cupric oxide with about 10% of finely divided graphite pressed into a shallow pie-pan shaped steel cup 14, the flange 15 of which fits within an annular groove in the inside of the grommet 12. A disc 16 of dialyzing paper covers the surface of the depolarizer 13 and three discs 17 of porous paper such as an alkali treated cellulose paper, kraft paper, filter paper or the like to fill the remainder of the space between dialyzing sheet 16 and the surface of zinc electrode 11. The paper sheets are impregnated with the primary cell electrolyte which may be a 43% solution of potassium hydroxide which is substantially saturated with the alkali zincate as described and claimed in Samuel Ruben application Serial No. 486,367, filed May 10, 1943 now Patent No. 2,481,539, issued September 13, 1949. The sheets contain sufficient electrolyte to provide electrolytic conductivity therethrough but insufficient to provide any free-flowing electrolyte which can run out of the spacer. The top flange 18 of cup 10 is turned or spun down over the top surface of grommet 12 to apply compression thereto and complete the cell assembly. Cup 10 comprises the negative terminal of the cell and cup 14 the positive terminal. While the outer surface of cup 14 is shown substantially flush with flange 18 in the completed cell, it is contemplated that in some cases the surface of cup 14 may extend slightly above the flange so that several of the cells can be stacked up to provide a series connection of the cells to form a battery.

Figure 3 illustrates an assembly of this type having protruding positive terminals 14a and provided with spacing rings 19 of insulating material to insure against short circuiting of the cells at the edges. This structure permits the assembly of cells in series without the use of any interconnecting leads ordinarily needed in making a series combination.

While cells of this type display no generation of gas under normal conditions of storage and use, it has been found that when they are connected in a battery and one cell becomes exhausted due to total consumption of the depolarizer and resulting conversion of the depolarizer oxide to the metal, such as mercury or copper, some gas is generated if the cell remains in the circuit with unexhausted cells from which current is still being drawn. As a result such cells gradually build up internal pressure which may cause the container or top to bulge and finally break the seal. If this occurs it will render the entire battery useless because of the open circuit produced by the bulging of the one cell.

Figure 1 shows a vent arrangement for avoiding this difficulty. This comprises a small hole 20 pierced in the bottom of cup 14. The depolarizer composition 13 is pressed into the cup thereby closing the vent hole 20. The cell is, therefore, hermetically sealed by the depolarizer at the beginning of service. However, when the depolarizer 13 has been consumed and the oxide converted to the corresponding metal, the depolarizing layer becomes porous and permeable to gas. The hole 20, therefore, comes into service as a vent as the depolarizer becomes depleted. This prevents the building up of gas pressure within the cell and permits more complete utilization of the remaining cells in the battery before discard.

Figures 4 and 5 illustrate a vent applied to another primary cell structure comprising a steel can 21 having depolarizer 22 pressed into the bottom thereof and a pressed layer 23 of porous inert material such as magnesium silicate, magnesium hydroxide or other inert powder over the depolarizer. A paper layer 24 is over the inert layer and the anode assembly 25 comprises a roll of alternate layers of zinc foil 32 and porous paper 33 impregnated with electrolyte. The outer surface of the roll is covered with an insulating sheet or layer 34. The top 26 may comprise a steel disc coated with zinc amalgam 31 and the sealing member comprises a rubber or neoprene grommet 27 spun under the top edge of the can and resting on a shoulder of the can.

The vent construction in this cell comprises a hole 28 pierced in the center of the bottom of the can 21 where it is completely covered by the depolarizer. Figure 5 shows the vent construction in magnified detail. To provide a further seal a thin disc or layer 29 of neoprene cement closes the hole inside the can. This maintains a seal until gas pressure is generated.

The amalgam coated iron or steel terminal of the zinc electrode permits construction of a cell which is free of liability of electrolyte creepage, and of external corrosion. It also permits improved cell structures, due to the higher strength available in the negative terminal member.

The construction shown in Figures 1 and 2 utilized the strength available in the negative terminal in an improved structure. By clamping the zinc electrode 11 under the sealing grommet the electroylte is largely confined to the active face of the zinc and flow to the joint between the zinc and the terminal cup 10 is retarded.

While specific embodiments of the invention have been described, it is intended to cover the invention broadly within the spirit and scope of the appended claims.

What is claimed is:

1. A primary cell comprising a first cup of ferrous metal, an electrode in the bottom thereof, a porous spacer over said electrode and an electrolyte impregnating said spacer, a second cup of ferrous metal of smaller outer dimensions than the inner dimensions of said first cup, a second electrode of opposite polarity to said first electrode in the bottom of said second cup, said second cup being faced into said first cup with said second electrode in contact with said spacer, an insulating sealing ring spacing the outer edge of said second cup from the inside wall of said first cup and sealing the space between them, and an amalgam layer interposed only between the inner surface of one of said cups and the corresponding surface of the electrode in said cup.

2. A primary cell comprising a zinc electrode, a depolarizing composition electrode, a porous spacer and an alkaline electrolyte impregnating said spacer, and a case for said cell comprising a pair of terminal cups of ferrous metal, one of said cups having its free edge turned outward to form an external flange, an insulating sealing ring embracing said flange, said flanged cup being faced into the other of said cups with the sealing ring spacing said flange from the inside walls of said other cup, the edge of said other cup being turned down over said ring to apply pressure thereto, said electrodes being disposed respectively in the bottoms of said two cups and said impregnated spacer being interposed therebetween in contact therewith, and an amalgam layer interposed only between the inner surface of one of said cups and the corresponding surface of the electrode in said cup.

3. A primary cell comprising a steel cup, a coating of zinc amalgam only on the inside surface thereof, an amalgamated zinc electrode disc in the bottom thereof, an elastic insulating sealing ring resting on said zinc disc adjacent the side wall of said cup, a porous spacer comprising a plurality of porous discs resting on said zinc disc inside said ring, an alkaline electrolyte impregnating said spacer, a second smaller steel cup faced against the top surface of said spacer and having a flange extending into an annular groove inside said sealing ring, and a depolarizer composition of a reducible metal oxide and a conductive inert material filling said second cup and in contact with said spacer, the edge of the first mentioned cup being turned down over said sealing ring to apply pressure thereto and seal said cell.

4. A primary cell comprising a steel cup, a lining of zinc amalgam coating only the inside thereof, a zinc electrode in the bottom thereof in contact with said lining, a layer of porous spacer material on top of said zinc electrode and an alkaline electrolyte impregnating said layer, a depolarizing electrode over said porous layer and an inert metal terminal layer in contact with the upper surface of said depolarizing electrode, and an insulating sealing ring sealing the space between said inert terminal and said steel cup.

5. A primary cell comprising a steel cup having an inturned rim, a lining of zinc amalgam coating only the inside thereof, a zinc electrode layer covering the bottom thereof over said coating, a sealing ring of compressible insulating material resting on said zinc electrode near its outer edge and compressed under the rim of said cup, a layer of porous spacer material resting on said zinc electrode inside said ring, an alkaline electrolyte impregnating said spacer layer, a layer of depolarizing oxide composition resting on said spacer layer, and a top steel disc covering said depolarizing layer and held at its outer edge in an annular recess in said sealing ring.

6. A sealed alkaline primary cell comprising a pair of terminal members, an insulating sealing member clamped between cooperating surfaces of said terminal members and constituting therewith the enclosure of the cell, one of said terminal members being formed of ferrous metal and having a layer of zinc amalgam only on the inner surface thereof, an amalgamated zinc electrode in pressure contact with said layer of zinc amalgam, a depolarizing electrode in contact with the other of said terminal members, and an alkaline electrolyte in contact with said electrodes whereby electrolyte creepage to the outside of the cell under said sealing member and along the outer surface of said terminal member of ferrous metal is positively prevented.

7. A sealed alkaline primary cell comprising positive and negative terminal members of ferrous metal, an insulating sealing member held compressed between cooperating surfaces of said terminal members and constituting therewith a generally fluid-tight enclosure for the cell, a layer of zinc amalgam only on the inner surface of said negative terminal member, an amalgamated zinc electrode in pressure contact with said zinc amalgam layer, a depolarizing composition electrode in contact with the inner surface of said positive terminal member, and an alkaline electrolyte in contact with said electrodes, the outer surface of said cell enclosure with the exception of the sealing member being constituted of ferrous metal whereby electrolyte creepage to the outside of the cell under said sealing member and along said outer surface of the cell enclosure is positively prevented.

8. A sealed alkaline primary cell comprising a pair of terminal members, an insulating sealing ring held under compression between cooperating surfaces of said terminal members and defining therewith a normally fluid-tight enclosure for the cell, one of said terminal members being formed of steel and having a layer of zinc amalgam only on the inner surface thereof, an amalgamated zinc electrode in pressure contact with said layer of zinc amalgam, a depolarizing electrode in contact with the other of said terminal members, and an alkaline electrolyte in contact with said electrodes whereby electrolyte creepage to the outside of the cell under said sealing ring and along the outer surface of said steel terminal member is positively prevented.

9. A sealed alkaline primary cell comprising positive and negative terminal members of steel, an insulating sealing member held compressed between cooperating surfaces of said terminal members and constituting therewith a generally fluid-tight enclosure for the cell, a layer of zinc amalgam only on the inner surface of said negative terminal member, an amalgamated zinc electrode in pressure contact with said zinc amalgam layer, a depolarizing composition electrode in contact with the inner surface of said positive terminal member, and an alkaline electrolyte in contact with said electrodes, the entire outer surface of said cell enclosure with the exception of the sealing member being constituted of steel whereby electrolyte creepage to the outside of the cell under said sealing member and along said outer surface of the cell enclosure is positively prevented.

10. A sealed alkaline primary cell comprising positive and negative terminal members of ferrous metal, an insulating sealing member held compressed between cooperating surfaces of said terminal members and constituting therewith a generally fluid-tight enclosure for the cell, a layer of zinc amalgam only on the inner surface of said negative terminal member, an amalgamated zinc electrode in pressure contact with said zinc amalgam layer, a compressed depolarizing composition electrode in contact with the inner surface of said positive terminal member, and an alkaline electrolyte in contact with said electrodes, the wall of said positive terminal having a perforation therein normally covered by the compressed depolarizing composition to provide an emergency vent for the cell upon consumption of said composition when the porosity of such composition increases.

11. A sealed alkaline primary cell comprising a cup of ferrous metal having a perforation in the bottom thereof, a depolarizer composition electrode pressed into said cup, a zinc electrode inside said cell spaced from said depolarizer, an immobilized body of an alkaline electrolyte interposed between said electrodes, a terminal member of ferrous metal having a layer of zinc amalgam only on the inner surface thereof in pressure contact with said zinc electode, and an insulating sealing member compressed between cooperating surfaces of said cup and terminal member and defining therewith a generally fluid-tight enclosure for the cell, the perforation in said cup being normally closed by said compressed depolarizer composition to maintain said fluid-tight enclosure and being capable of releasing excessive internal pressure when said composition is substantially consumed and becomes porous.

12. A sealed alkaline dry cell comprising a first cup of ferrous metal having a depolarizing cathode electrode in the bottom thereof, a second cup of ferrous metal having an amalgam layer only on the inner surface thereof, a zinc anode located in said second cup and in contact with said amalgam layer, an immobilized electrolyte in contact with said cathode and anode, and an insulating sealing ring compressed between interfitted and spaced marginal portions of said cups defining with the cups a sealed enclosure for the cell.

HOWARD E. RHODES.

REFERENCES CITED

The following references are of record in the file of this patent:

UNITED STATES PATENTS

| Number | Name | Date |
|---|---|---|
| Re. 13,174 | Morrison | Nov. 22, 1910 |
| 428,684 | Mason | May 27, 1890 |
| 618,993 | Paget | Feb. 7, 1899 |
| 1,331,456 | Ellis | Feb. 17, 1920 |
| 1,611,153 | Benner et al. | Dec. 21, 1926 |
| 1,644,344 | Martus et al. | Oct. 4, 1927 |
| 1,920,799 | Lilienfeld | Aug. 1, 1933 |
| 2,111,041 | Brennan | Mar. 15, 1938 |
| 2,422,046 | Ruben | June 10, 1947 |

FOREIGN PATENTS

| Number | Country | Date |
|---|---|---|
| 324,415 | Great Britain | Jan. 30, 1930 |
| 414,582 | Great Britain | Aug. 8, 1934 |